(12) United States Patent
Liu et al.

(10) Patent No.: US 7,706,116 B2
(45) Date of Patent: Apr. 27, 2010

(54) SSPC TECHNOLOGY INCORPORATED WITH THERMAL MEMORY EFFECTS TO ACHIEVE THE FUSE CURVE COORDINATION

(75) Inventors: Zhenning Z Liu, Mississauga (CA); Ted J. Gayowsky, Mississauga (CA); Randy J. Fuller, Hillsburgh (CA); Wenjiang Yu, Mississauga (CA); Yang Ye, Mississauga (CA); Daniel G Filimon, Richmondhill (CA); Boris Plivcic, Oakville (CA); That Nguyen, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 583 days.

(21) Appl. No.: 11/655,991

(22) Filed: Jan. 22, 2007

(65) Prior Publication Data

US 2008/0174928 A1    Jul. 24, 2008

(51) Int. Cl.
H02H 9/02 (2006.01)
H02H 5/04 (2006.01)

(52) U.S. Cl. .................. 361/93.1; 361/103; 361/104

(58) Field of Classification Search ............... 361/103, 361/93.1, 104
See application file for complete search history.

(56) References Cited

U.S. PATENT DOCUMENTS

| | | | |
|---|---|---|---|
| 3,627,421 A * | 12/1971 | Harley et al. ............... 356/313 |
| 4,338,511 A * | 7/1982 | Six .............................. 219/497 |
| 4,727,450 A | 2/1988 | Fachinetti et al. | |
| 5,283,708 A | 2/1994 | Waltz | |
| 5,287,078 A | 2/1994 | Larson | |
| 5,448,442 A | 9/1995 | Farag | |
| 5,550,702 A | 8/1996 | Schmidt et al. | |
| 5,723,915 A | 3/1998 | Maher et al. | |
| 5,854,731 A | 12/1998 | Thomas | |
| 6,052,268 A | 4/2000 | Thomas | |
| 6,137,668 A | 10/2000 | Feldtkeller | |

(Continued)

OTHER PUBLICATIONS

Friedman, S., 1997, "Robust / Low Cost SSPC's are Finally Available", National Aerospace & Electronics Conference, Proceedings of the IEEE 1997 Dayton OH, USA, (Jul. 14-17, 1997) 1:145-150.

(Continued)

*Primary Examiner*—Fritz M. Fleming
*Assistant Examiner*—Lucy Thomas
(74) *Attorney, Agent, or Firm*—Oral Caglar, Esq.

(57) ABSTRACT

Methods and apparatuses implement a thermal memory effect for a solid state power controller. A solid state power controller trip apparatus with thermal memory according to one embodiment comprises: a trip module including a first capacitor (156) and a counter (174), wherein the first capacitor (156) charges multiple times, when an over current event occurs, and the counter (174) accumulates a count related to the charging of the first capacitor (156) for the multiple times, to detect a trip condition; and a discharging module connected to the trip module, the discharging module including a resistor (166) and a second capacitor (158), wherein an electrical parameter associated with the count decays with time using the resistor (166) and the second capacitor (158).

18 Claims, 4 Drawing Sheets

U.S. PATENT DOCUMENTS

| | | |
|---|---|---|
| 6,205,010 B1 | 3/2001 | Ohsaka et al. |
| 6,351,360 B1 | 2/2002 | Kotowski et al. |
| 6,356,423 B1 | 3/2002 | Hastings et al. |
| 6,381,114 B1 | 4/2002 | Mansfield |
| 6,738,246 B1 | 5/2004 | Strumpler |
| 6,770,985 B2 | 8/2004 | Yabe et al. |
| 2004/0156154 A1 | 8/2004 | Lazarovich et al. |
| 2006/0087782 A1 | 4/2006 | Michalko et al. |

OTHER PUBLICATIONS

Hodges et al., 1996, "Fault Control System Using Solid State Circuit Breakers and High Temperature Superconducting Fault Current Limiters", Proceedings of the 1996 $22^{nd}$ Intl Power Modulator Symposium (Jun. 24-27, 1996), Boca Raton, FL. IEEE Publisher; pp. 232-234.

* cited by examiner

SSPC TECHNOLOGY INCORPORATED WITH THERMAL MEMORY EFFECTS TO ACHIEVE THE FUSE CURVE COORDINATION

BACKGROUND OF THE INVENTION

1. Field of the Invention

The present invention relates to electric power distribution systems, and more particularly to a method and apparatus for incorporating thermal memory effects into a Solid State Power Controller (SSPC), to achieve coordination between a fuse and the SSPC.

2. Description of the Related Art

Solid State Power Controllers (SSPCs) are poised to become important components in electric power distribution systems for commercial aircraft applications. Advantages of SSPC technology include: light weight and small size of SSPC devices, reduced maintenance requirements, and increased reliability. Hence, the SSPC technology represents an attractive alternative to conventional distribution systems including electro-mechanical relays and circuit breakers.

However, the possibility of fail-short events for the SSPCs presents serious safety considerations. These safety considerations are a critical element in the certification of the SSPC technology for commercial aircraft. In order to meet the safety and reliability requirements enforced by certification authorities, an additional protection mechanism is often associated with the SSPC. The interaction between the SSPC and the additional protection mechanism has added further complexity to the use of SSPC technology in commercial aircraft.

One known method that incorporates a thermal memory into an SSPC is described in U.S. Pat. No. 5,723,915 titled "Solid State Power Controller", by T. R. Maher et al. With the technique described in this patent, a thermal memory feature is used with an SSPC, to mimic the performance characteristics of traditional circuit breakers. This technique, however, does not address the safety concern of the fail-short mode of the MOSFET in the SSPC. Moreover, the circuit implementation of this technique requires resistance values that are not recommended for aerospace applications, and capacitance values that can cause high leakage and high variations in trip timing.

Another known method that associates an additional protection mechanism with an SSPC is described in U.S. Pat. No. 5,287,078 titled "Safety Fuse Apparatus for Solid State Power Controllers", by E. K. Larson. With the technique described in this patent, a U-shaped, metal alloy based safety device is associated with an SSPC. The safety device has performance characteristics that conform to selected SSPC time-current curves, to avoid interference with normal operation of the SSPC. The use of this new U-shaped metal alloy based safety device, however, can compromise the optimization of wire selection and faces problems with the certification of the SSPC technology for commercial aircraft, due to lack of field experience.

Disclosed embodiments of this application address these and other issues by implementing SSPC trip mechanisms with thermal memory effect, to coordinate between an SSPC trip curve and the characteristics of an additional protection mechanism, such as a fuse. Embodiments of the present invention divide a thermal memory effect into an initial thermal memory and a thermal memory due to over current, to achieve practical, semi-digital circuit implementations of the thermal memory effect. In one embodiment, a capacitor is charged multiple times during an over current condition, to produce a count that represents the temperature in a wire subjected to the over current. Temperature variation in the wire during the over current condition is represented with a discharge capacitor, a resistor, and a voltage associated to the trip count.

SUMMARY OF THE INVENTION

The present invention is directed to methods and apparatuses for implementing a thermal memory effect for a solid state power controller. According to a first aspect of the present invention, a solid state power controller trip apparatus with thermal memory comprises: a trip module including a first capacitor and a counter, wherein the first capacitor charges multiple times, when an over current event occurs, and the counter accumulates a count related to the charging of the first capacitor for the multiple times, to indicate a temperature increase in a wire for detection of a trip condition; and a discharging module connected to the trip module, the discharging module including a resistor and a second capacitor, wherein an electrical parameter associated with the count decays with time using the resistor and the second capacitor.

According to a second aspect of the present invention, a solid state power controller with thermal memory effect comprises: a trip mechanism for providing a trip characteristic compatible with a fuse, the trip mechanism including a semi-digital module for detecting an over current event in a wire connected to the solid state power controller, to indicate a trip condition, and a discharging module including a resistor and a first capacitor operationally connected to the semi-digital module, the discharging module receiving an electrical parameter from the semi-digital module and producing a decay of the electrical parameter with time, the decay being connected to a temperature of the wire.

According to a third aspect of the present invention, a method for implementing a thermal memory effect for a solid state power controller comprises: charging a first capacitor multiple times, when an over current event occurs due to a current; accumulating a count related to the charging step for the multiple times, to detect a trip condition; and generating a decay of an electrical parameter associated with the count to simulate evolution of a wire temperature related to the current.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Aspects of the invention are more specifically set forth in the accompanying description with reference to the appended figures.

To avoid fail-short events for an SSPC, an additional protection mechanism is associated with the SSPC, according to the present invention. The additional protection mechanism may be, for example, included in series with the SSPC. The additional protection mechanism provides appropriate wire protection for the given energy rating, when the SSPC fails. A fuse is one type of additional protection mechanism that can be connected to an SSPC, according to the present invention. The present invention incorporates a thermal memory function into the SSPC, to enable the SSPC to interrupt repetitive faulty currents sooner than most $I^2t$ based conventional SSPC devices, and to achieve the proper coordination between the trip curve of the SSPC and the fuse characteristics. The thermal memory effect may be incorporated into an SSPC Trip Engine, to address safety concerns due to the fail-short mode of the MOSFET in the solid-state power switch.

Figure 1:
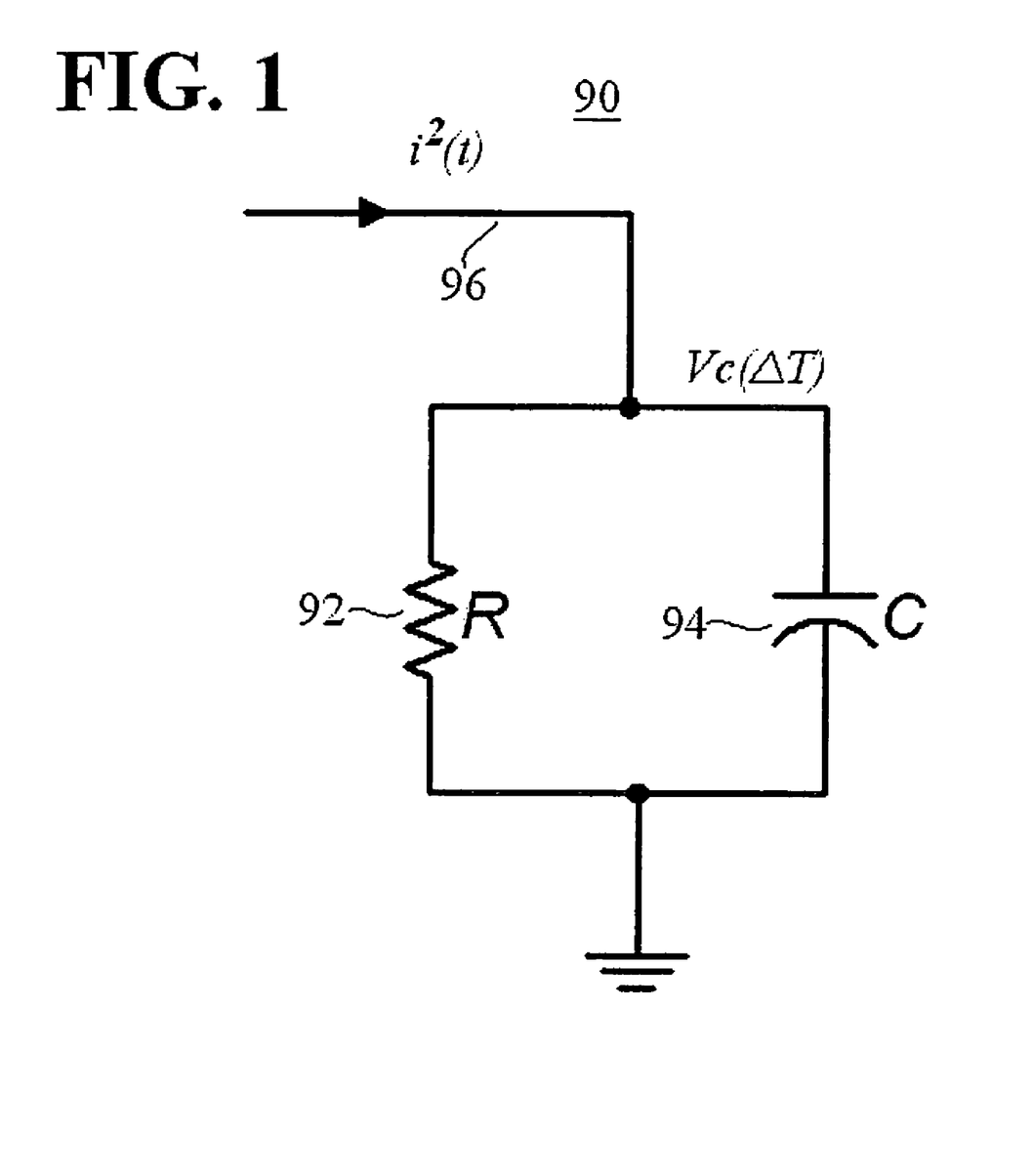
FIG. 1 is a diagram of a circuit implementing thermal behavior for temperature rise in a wire.

FIG. 1 is a diagram of a circuit implementing thermal behavior for temperature rise in a wire. The circuit 90 illustrated in FIG. 1 includes a resistor 92 and a capacitor 94, connected to a wire 96.

FIG. 1 illustrates an equivalent circuit implementation for the temperature rise in a wire. The governing equation for the temperature rise versus current in wire 96 is:

$$\frac{d}{dt}\Delta T = -\frac{1}{k_1}\Delta T + \frac{1}{k_2}i^2(t) \qquad (1)$$

where $k_1$ and $k_2$ are constants determined by the material of the wire, i(t) is the instantaneous electric current in the wire, and $\Delta T$ is the temperature rise of the wire due to the electric current.

Equation (1) can be emulated by injecting the same current signal $i^2(t)$ into a capacitor C (element 94) connected in parallel with a resistor R (element 92), as illustrated in FIG. 1. When constants $k_1$ and $k_2$ are selected as $k_1=C*R$ and $k_2=C$, the temperature variation $\Delta T$ corresponds to the voltage Vc, because equation (2) holds for the circuit in FIG. 1:

$$\frac{d}{dt}Vc = -\frac{1}{C*R}Vc + \frac{1}{C}i^2(t). \qquad (2)$$

The physical meaning of the temperature rise $\Delta T$ in a wire is thus tied to the voltage Vc in capacitor C, and the thermal memory effect can be interpreted as the electronic charges (or voltage) remaining in capacitor C. These charges take time to accumulate or disappear.

To obtain coordination between a fuse and an SSPC, a thermal memory effect can be implemented using the circuit in FIG. 1. When the voltage Vc across capacitor C exceeds a preselected value because of an over current, the wire temperature rise has exceeded its safe operating limit, and the current in the circuitry connected to circuit 90 needs to be interrupted.

One drawback of circuit 90 in FIG. 1 is that it is difficult to find practical resistor and capacitor values R and C that can produce a representative time constant for the thermal behavior of the wire 96 connected to the circuit 90. This happens because practical resistor and capacitor values that implement the required timing accuracy for over-current interruption, lead to large resistance and capacitance values R and C. Large capacitance values lead to high capacitor leakage and high variations in trip timing. Large resistance values are not recommended for aerospace applications. Moreover, large capacitance and resistance values present component tolerance issues in extreme temperature environments. Such extreme temperature environments are typical in complex environments such as aerospace, vehicle, and industrial applications.

Figure 2:
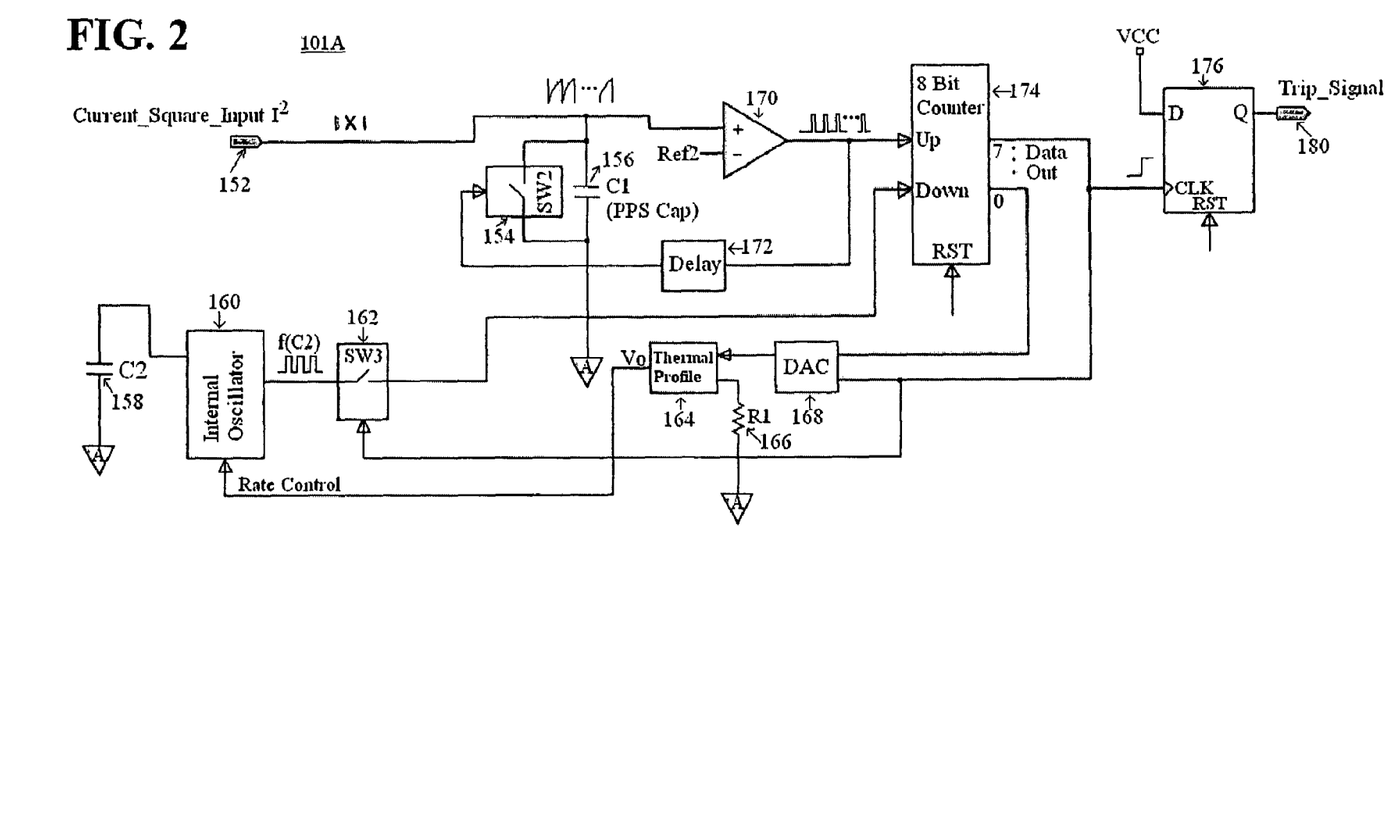
FIG. 2 is a circuit diagram implementing an SSPC trip mechanism with thermal memory effect according to an embodiment of the present invention.
Figure 3:
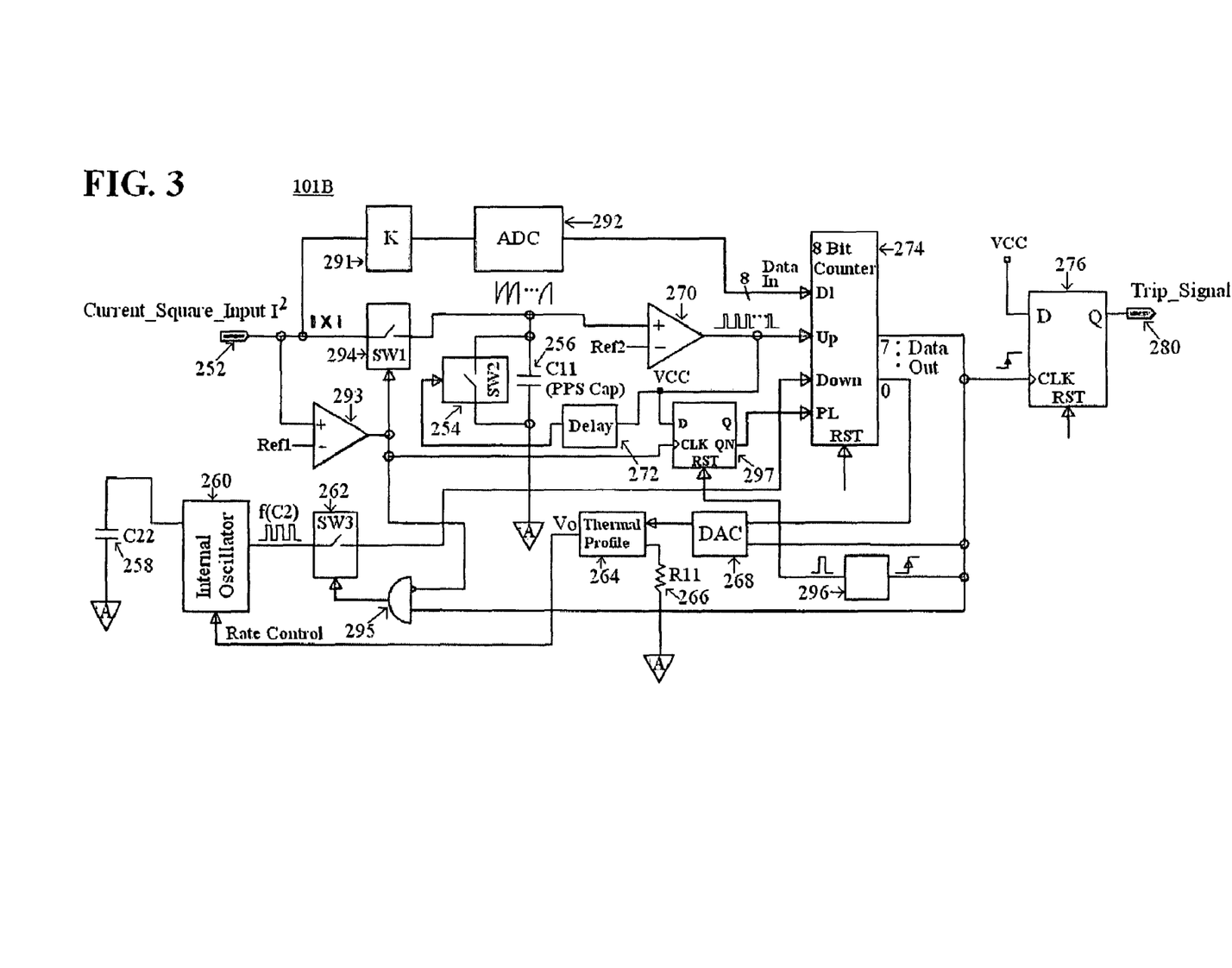
FIG. 3 is a circuit diagram implementing an SSPC trip mechanism with thermal memory effect according to a second embodiment of the present invention.
Figure 4:
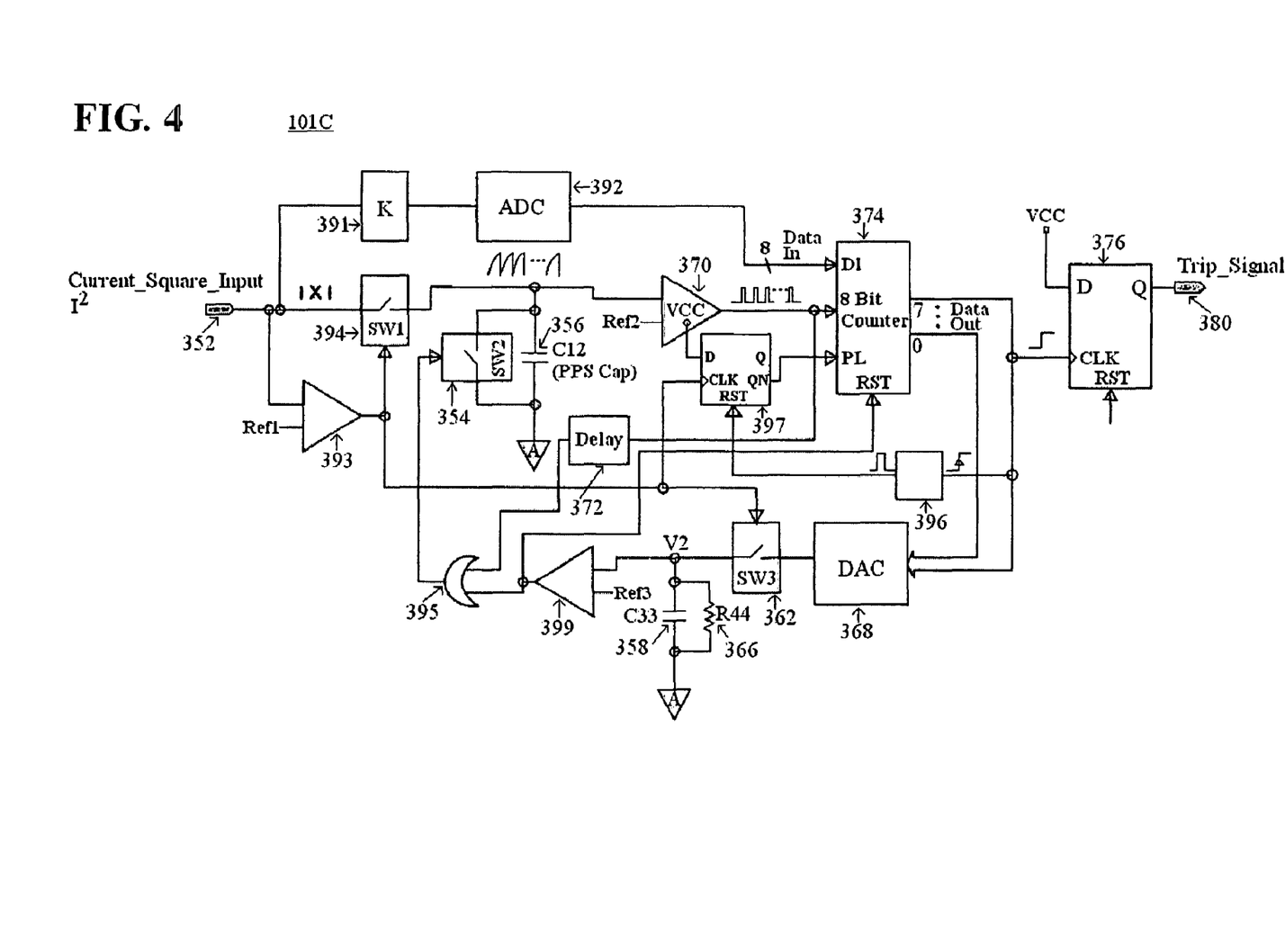
FIG. 4 is a circuit diagram implementing an SSPC trip mechanism with thermal memory effect according to a third embodiment of the present invention.

To achieve circuit implementations for the wire thermal behavior according to the present invention, the thermal memory effect is realized as a combination of two elements: an initial thermal memory, and a thermal memory due to over current. The initial thermal memory is due to a wire current equal to or less than the nominal value for which the wire is rated. The initial thermal memory can be implemented using the voltage across a capacitor, before an over current incidence occurs. This initial capacitor voltage can be assumed to be proportional to the square of the wire current, $i^2(t)$. The thermal memory due to the over current represents accumulated charges, or voltage, stored in the capacitor immediately after an over current event has occurred, or after the over current has disappeared. Such an over current decays (or decreases) exponentially with time. FIGS. 2, 3, and 4 implement the thermal memory effect including an initial thermal memory and a thermal memory due to the over current.

FIG. 2 is a circuit diagram implementing an SSPC trip mechanism 101A with thermal memory effect according to an embodiment of the present invention. FIG. 2 illustrates a semi-digitized implementation for thermal memory effect for an SSPC.

The SSPC trip mechanism 101A is included into an SSPC. A current square input of a current I passing through a wire (not shown) connected to the SSPC, is input into SSPC trip mechanism 101A. An additional protection device, such as, for example, a fuse, may be connected in series with the SSPC. The SSPC trip mechanism 101A makes the SSPC trip characteristics compatible with the characteristics of the fuse, in a manner described in detail below.

In the circuit 101 in FIG. 2, a small PPS capacitor 156 is used for over current trip timing. The capacitor 156 has low leakage and small tolerance, with a capacitance C1 equal to $\frac{1}{128}$ of a desired capacitor value. This desired capacitor value is determined by the SSPC channel rating, the wire smoke curve, and the fuse characteristics. In order to achieve desirable timing, an 8-digit counter 174 is introduced in the circuit 101. Each time capacitor C1 charges up to a voltage level set by the reference voltage Ref2, the counter 174 increases by one count, and the switch SW2 (element 154) closes, to empty the charge stored in capacitor C1. The switch SW2 will remain closed with a delay until the voltage across capacitor C1 falls back below the Ref2. When the counter 174 counts up to 128, a Trip Signal at terminal 180 is asserted and latched. The Trip Signal indicates to control circuitry that the current needs to be interrupted, as it has caused the counter 174 to reach 128 counts. With this technique, capacitor value of C1 is equivalently increased 128 times, and the content of counter 174 becomes the digitized equivalent voltage across a capacitor with equivalent capacitance of 128*C1.

In order to emulate the effect of the resistor R (element 92) in FIG. 1, a digital to analog converter (DAC) 168 is used to convert the counter 174 content into a processed voltage output Vo. The processed voltage output Vo further controls the pulse rate feeding to the count-down input of the counter 174, and creates an effect that is equivalent to a constant discharge process for capacitor C (element 94) through resistor R (element 92) in FIG. 1. Hence, for the SSPC trip mechanism 101A, the thermal memory effect is determined by voltage Vo, resistor R1 (element 166), and capacitor C2 (element 158).

In an exemplary embodiment, the thermal profile generator 164 is used to convert the counter 174 content into an exponentially processed voltage output Vo. The thermal profile generator 164 is used to produce the voltage output (Vo) as Vo=K1*exp(−K2*Vi/R1), where Vi is the output of the DAC 168 and the input to the thermal profile generator 164, K1 and K2 are two constants, and resistor R1 controls the voltage decay rate.

The SW3 switch 162 is used to avoid counter content overflow when the counter reaches 0, as it may happen due to continuing count-down pulses.

Values for capacitance C2 (for element 158) and resistance R1 (for element 166) can be selected based on the thermal memory decaying time for a typical wiring environment. Thermal memory decaying time for wires can be obtained through tests for the temperature variation/temperature decrease in wires carrying currents.

The SSPC trip mechanism 101A effectively solves the timing problem associated with practical capacitor values, mentioned at FIG. 1. The SSPC trip mechanism 101A uses capacitor values that produce a representative time constant for the thermal behavior of a wire connected to the circuit 101A. The SSPC trip mechanism 101A provides timing accuracy for over-current interruption, and uses capacitors with reduced capacitor values, to avoid leakage and withstand a high temperature environment.

FIG. 3 is a circuit diagram implementing an SSPC trip mechanism 101B with thermal memory effect according to a second embodiment of the present invention. FIG. 3 illustrates another semi-digitized implementation for thermal memory effect for an SSPC.

The SSPC trip mechanism 101B is included into an SSPC. A current square input of a current I passing through a wire (not shown) connected to the SSPC, is input into SSPC trip mechanism 101B. An additional protection device, such as, for example, a fuse, may be connected in series with the SSPC. The SSPC trip mechanism 101B makes the SSPC trip characteristics compatible with the characteristics of the fuse.

The SSPC trip mechanism 101B with thermal memory effect relaxes constraints associated with Vo signal generation. With the SSPC trip mechanism 101B, the Vo signal value does not have to be generated with a high accuracy. Hence, the circuit 101B maintains counter dynamic balance when input current is within nominal operating levels, even when the Vo signal value contains errors. As described below, no trip action is generated by the circuit 101B when the input current is equal to or less that than its nominal value.

To relax constraints associated with Vo signal generation, a comparator 293 is used to separate an over current event from normal current operation, using a voltage reference value Ref1. When a current I, passing through a wire connected to circuit 101B, is equal to or less than the nominal value, the "parallel loading" (PL) mode of the counter 274 is selected. At that time, the content of the counter 274 is loaded with a value (number) that is proportional to the wire current square ($I^2$), as transmitted through the analog to digital converter (ADC) 292, to implement the initial thermal memory effect. In this situation, the content of the counter 274 will change with the input current square signal. At the same time, the counter 274 is disabled for counting-up or counting-down. Hence, the counter 274 will never exceed 128 counts (the count that causes a trip action), so that no trip action will be generated when the current I passing through the circuit is equal to or less than the nominal value. In the circuit 101B in FIG. 3, the element 291 is a gain control circuit of gain K, and unit 297 is a circuit that can be triggered by a clock and can be reset. Unit 297 can be, for example, a flip-flop circuit. Element 296 connected to the flip-flop 297 may be, for example, a monostable.

In an over current condition with an input current I larger than the nominal value, counter 274 resumes operation in its normal count-up/count-down mode. In this case, the SSPC trip mechanism 101B operates in the same manner as the trip mechanism 101A described at FIG. 2. The thermal memory effect is determined by voltage Vo, resistor R11 (element 266), and capacitor C22 (element 258).

FIG. 4 is a circuit diagram implementing an SSPC trip mechanism 101C with thermal memory effect according to a third embodiment of the present invention.

The SSPC trip mechanism 101C is included into an SSPC. A current square input of a current I passing through a wire (not shown) connected to the SSPC, is input into SSPC trip mechanism 101C. An additional protection device, such as, for example, a fuse, may be connected in series with the SSPC. The SSPC trip mechanism 101C makes the SSPC trip characteristics compatible with the characteristics of the fuse.

The circuitry associated with the counter count-down process, which included an internal oscillator and a thermal profile generator in the circuit 101B in FIG. 3, is replaced in the SSPC trip mechanism 101C in FIG. 4 with a comparator 399 and an analog RC circuit including capacitor C33 (element 358) and resistor R44 (element 366). With this implementation, there is no count-down process for the counter 374.

During normal current operation, the circuitry portion including comparator 393, PPS capacitor C12 (element 356), the switch SW2, and the ADC 392 functions in similar manner to the circuitry including comparator 293, PPS capacitor C11 (element 256), switch SW2, and ADC 292 in FIG. 3.

During an over current condition, the DAC 368 is used to convert the counter 374 content into a processed voltage output V2. The processed voltage output V2 creates an effect that is equivalent to a constant discharge process for capacitor C (element 94) through resistor R (element 92) in FIG. 1. The thermal memory effect is determined by voltage V2, resistor R44 (element 366), and capacitor C33 (element 358).

In case an over current falls back to normal range before counter 374 has counted up to 128, the count-up process is terminated by the opening of the switch SW1, and the voltage across capacitor C33 (element 358) starts to decay through the discharge resistor R44 (element 366) following the opening of switch SW3. The content of the counter 374 will remain unchanged, and approximates the thermal memory stored in the wire due to previous over current, until voltage V2 falls below the reference value Ref3. The duration of the approximated thermal memory implemented in this manner is determined by the component values C33 (element 358) and R44 (element 366), as well as by the remaining content of counter 374. Since C33 and R44 are not linked to the over current trip timing, the requirements for the selection of capacitor C33 and resistor R44 are significantly relaxed.

The SSPC trip mechanisms illustrated in FIGS. 2, 3, and 4 may be included in an SSPC, to incorporate the thermal memory effect into the SSPC and allow the use of the SSPC, along with a conventional fuse, for aircraft secondary electric power distribution. Hence, the SSPC trip mechanisms illustrated in FIGS. 2, 3, and 4 address the safety concerns related to the particular failure mode (fail-short) of the semiconductor power switching devices. Hence, the current invention incorporates the thermal memory effect into an SSPC, to enable coordination of the SSPC with another protection device, such as a conventional fuse. The thermal memory function incorporated into the SSPC according to the present invention, allows the SSPC to be used along with a conventional fuse, to achieve the certification requirements of the SSPC technology for commercial aircraft applications. The thermal memory function enables the SSPC to interrupt repetitive faulty currents sooner than most $I^2t$ based conventional SSPC devices, and to achieve the proper coordination between the SSPC trip curve and the trip curve of the fuse. In this manner, the fuse does not interact with the SSPC protection in case of a current fault. The fuse takes action and performs its functions only when the SSPC fails to react to the over current fault correctly. SSPC trip characteristics are thus made compatible with characteristics of low cost fuses.

Embodiments described in the present invention illustrate three systems that implement a thermal memory effect inside a mixed signal ASIC, to assure proper coordination between a fuse and the SSPC. The SSPC trip mechanisms with thermal memory effect described in the present invention divide the thermal memory effect into an initial thermal memory and a thermal memory due to over current, to achieve practical, semi-digital circuit implementations of the thermal memory effect. The semi-digital circuit implementations of the present invention can be implemented with practical resistor and capacitor values that avoid capacitor leakage, do not produce variations in trip timing, have high tolerance in extreme temperature environments, and are compatible with aerospace applications.

Embodiments of the present invention are applicable to a wide variety of environments, including aerospace, industrial, and vehicle environments.

We claim:

1. A solid state power controller trip apparatus with thermal memory, said apparatus comprising:
    a trip module including a first capacitor, a switch and a counter, wherein when said first capacitor charges to a level greater than set by a reference voltage, multiple times when an overcurrent event occurs, said counter accumulates a count related to said charging of said first capacitor to said level greater than said reference voltage for each of said multiple times, to indicate a temperature increase in a wire for detection of a trip condition and said switch closes to discharge said first capacitor for each of said multiple times; and
    a discharging module connected to said trip module, said discharging module including a resistor and a second capacitor, wherein an electrical parameter associated with said count decays with time using said resistor and said second capacitor, wherein said electrical parameter controls a pulse rate feeding to a count-down input of said counter, to produce a discharge timing effect in said trip module, wherein
    said trip apparatus is activated when said counter reaches a predetermined number of counts.

2. The apparatus with thermal memory according to claim 1, wherein
    said trip module implements an initial thermal memory due to a current in said wire, when said current is less than or equal to a nominal value, and
    said discharging module implements a thermal memory due to over current, wherein the decay of said electrical parameter with time is connected to a temperature of said wire due to said current.

3. The apparatus with thermal memory according to claim 1, wherein
    said counter increases by one count each time said first capacitor charges up to a level set by a reference voltage, and said trip module detects a trip condition when said count reaches a predetermined value.

4. The apparatus with thermal memory according to claim 1, wherein said electrical parameter is an analog voltage associated with said count.

5. The apparatus with thermal memory according to claim 1, wherein said trip module separates an over current condition from a normal current condition, and disables count accumulation in said counter during said normal current condition.

6. The apparatus with thermal memory according to claim 1, wherein said apparatus has
    a first mode of operation associated with a normal current condition, in which said counter does not accumulate a count,
    a second mode of operation associated with an over current event, and
    a third mode of operation, in which said discharging module produces a discharge timing effect in said trip module after an over current event, to simulate a temperature of said wire subjected to said over current event, wherein said resistor and said second capacitor determine said thermal memory for said apparatus.

7. The apparatus with thermal memory according to claim 1, wherein said apparatus coordinates its trip curve to characteristics of a fuse.

8. A solid state power controller with thermal memory effect, said controller comprising:
    a trip mechanism for providing a trip characteristic compatible with a fuse, said trip mechanism including
        a semi-digital module for detecting an over current event and indicating a trip condition, and
        a discharging module including a resistor and a first capacitor operationally connected to said semi-digital module, said discharging module receiving an electrical parameter from said semi-digital module and producing a decay of said electrical parameter with time, wherein
        said semi-digital module includes a second capacitor and a counter, said second capacitor charging to a level set by a reference voltage multiple times when an over current event occurs and said switch closing to discharge said second capacitor for each of said multiple times then discharging, said counter accumulating a count related to said charging of said second capacitor for each of said multiple times, to detect said trip condition, and said discharging module produces a count-down of said counter associated with said decay, wherein said trip mechanism is activated when said counter reaches a predetermined number of counts.

9. The solid state power controller according to claim 8, wherein said discharging module further includes a digital to analog converter, a thermal profile generator and an internal oscillator, to obtain said electrical parameter and control said count-down of said counter.

10. The solid state power controller according to claim 8, wherein
    said semi-digital module implements an initial thermal memory due to a current, when said current is less than or equal to a nominal value, and
    said discharging module implements a thermal memory due to over current.

11. The solid state power controller according to claim 8, wherein said resistor and said first capacitor determine said thermal memory effect for said solid state power controller.

12. The solid state power controller according to claim 8, wherein said solid state power controller is connected in series with said fuse.

13. The solid state power controller according to claim 8, wherein said solid state power controller is used in aerospace applications.

14. A method for implementing a thermal memory effect for a solid state power controller, said method comprising:

charging a first capacitor multiple times, when an over current event occurs due to a current;

accumulating a count in a counter related to said charging step for each of said multiple times, to detect a trip condition, wherein said count accumulates each time that a charge in said first capacitor reaches a reference voltage;

closing a switch for discharging the capacitor when each count is accumulated in said counter;

generating a decay of an electrical parameter associated with said count to simulate evolution of a wire temperature related to said current; and decreasing said count in said counter based on said decay, wherein said accumulating step increases said count each time said charging step occurs, and issues a trip condition when said count reaches a predetermined value.

15. The method for implementing a thermal memory effect as recited in claim 14, wherein said method provides coordination between a trip curve of said solid state power controller, and characteristics of a fuse connected to said solid state power controller.

16. The method for implementing a thermal memory effect as recited in claim 14, wherein said charging and accumulating steps produce an initial thermal memory for a current in a wire, for said current being less than or equal to a nominal value, and said generating step produces a thermal memory due to over current.

17. The method for implementing a thermal memory effect as recited in claim 14, wherein said method is used for aerospace applications.

18. The method for implementing a thermal memory effect as recited in claim 14, wherein said method is implemented semi-digitally.

\* \* \* \* \*